United States Patent [19]

Wenham et al.

[11] Patent Number: 4,712,339
[45] Date of Patent: Dec. 15, 1987

[54] STRUCTURES FOR ENCLOSED TRANSFER OF PERSONS

[75] Inventors: Bruce T. Wenham; Raymond Cook; Clifford R. Hunter, all of Victoria, Australia

[73] Assignee: Astarni Pty. Ltd., Australia

[21] Appl. No.: 869,332

[22] Filed: Jun. 2, 1986

[30] Foreign Application Priority Data

Jun. 5, 1985 [AU] Australia ................ PH911

[51] Int. Cl.$^4$ ............................................. E04H 14/00
[52] U.S. Cl. .................................... 52/173 PS; 14/71.5
[58] Field of Search ...................... 52/173 DS; 14/71.5

[56] References Cited

U.S. PATENT DOCUMENTS

| 3,303,615 | 2/1967 | O'Neal | 52/2 |
| 3,644,952 | 2/1972 | Hatch | 14/71.5 |
| 3,693,204 | 9/1972 | Eggert, Jr. | 14/71.5 |
| 3,703,737 | 11/1972 | Eggert, Jr. | 14/71.5 |
| 3,816,867 | 6/1974 | Shiezad et al. | 14/71.5 |
| 4,120,067 | 10/1978 | Hone et al. | 14/71.5 |
| 4,333,194 | 6/1982 | Drozd | 14/71.5 |
| 4,333,195 | 6/1982 | Lichti | 14/71.5 |

Primary Examiner—William F. Pate, III
Assistant Examiner—Creighten Smith
Attorney, Agent, or Firm—Diller, Ramik & Wight

[57] ABSTRACT

Apparatus for providing a vector connection between openings in an enclosed walkway and an adjacent structure. The apparatus is mountable at the walkway opening to vector seal between the walkway and the apparatus. A tubular sealing part of flexible material provides a passageway with open ends for surrounding the walkway opening and structure opening, and a plurality of expandable chambers extend peripherally about the passageway. Expansion of the chambers flexes the sealing part causing it to project from the walkway and abut with a surface of an adjacent structure and surround the structure opening, whilst contraction of the chambers retract the sealing part from the structure back to adjacent the walkway opening. At least one of the chambers is adjacent the open end of the passageway near the structure and deforms as necessary upon abutment of the sealing part with the structures so that the sealing part conforms to the structure surface and vector seals completely about the structure opening.

22 Claims, 11 Drawing Figures

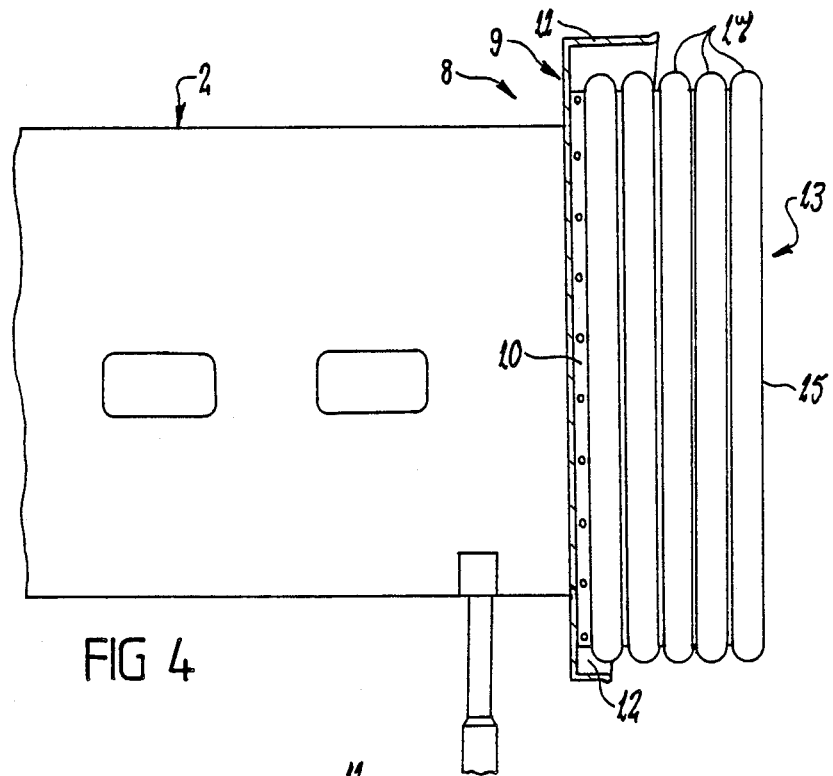
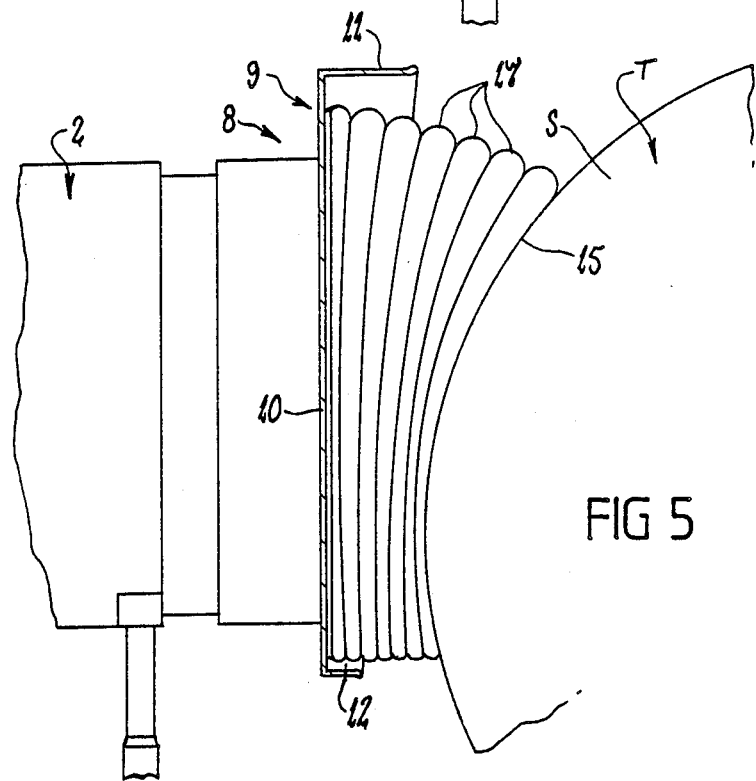

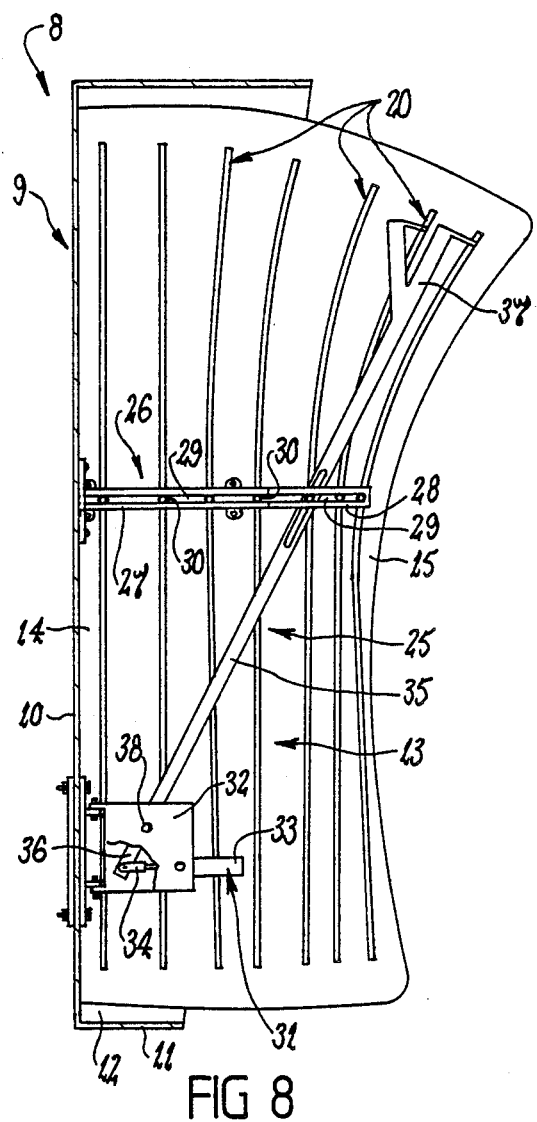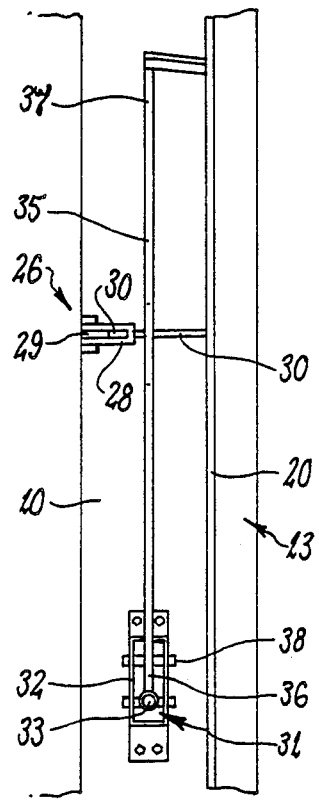
FIG 8
FIG 9

STRUCTURES FOR ENCLOSED TRANSFER OF PERSONS

This invention relates generally to the transfer of persons to and from enclosed spaces, and in particular to a connection apparatus for temporarily sealing an enclosed walkway to an opening of the space for enclosed transfer of persons therebetween, and also to a transfer structure providing the walkway and incorporating that connection apparatus. The transfer structure is applicable as a bridge for transferring passengers between travelcraft and terminals, such as aerobridges used to transfer passengers between aircraft and airport terminals. It will be convenient to hereinafter disclose the invention in relation to that exemplary application, although it is to be appreciated that the invention is not limited to that application.

Aerobridges are commonly used to transfer aircraft passengers along a horizontal walkway directly between an airport terminal building, such as a waiting lounge, and the interior of the aircraft. The bridge may be fixed and permanently positioned, be substantially mobile, be able to fold, telescope, pivot or otherwise move relative to a fixed station, or be a combination thereof. These bridges generally enable rapid transfer of passengers so that aircraft time on the ground at the terminal or "turn around" is minimal. In addition, transfer is comfortable for the passengers, particularly during inclement weather and for those unable to easily negotiate stairs or ramps traditionally used for such transfer.

However, there is a growing international concern surrounding the safety of those aerobridges, especially during emergency transfers. In particular, existing aerobridges may not be safe for evacuation of passengers from an aircraft where there is a fire on or adjacent the bridge. In that regard, the bridges are not necessarily constructed of fire resistant materials so may readily catch fire trapping people in the aircraft and/or in the walkway. Moreover, the bridges are not generally sealed adjacent the aircraft doorway so that fire may directly enter between the aircraft and bridge to the passengers.

In addition, because the current aerobridges are not sealed to the aircraft or quarantined from the terminal, they are not vector proof. Thus, although the interior of international aircraft may be disinfected upon arrival at a terminal, disease or infection may nevertheless survive and readily escape from the aircraft and into the atmosphere through the aerobridge or between the aircraft and aerobridge.

It is an object of the present invention to provide a connection apparatus and transfer structure incorporating that apparatus that may alleviate these problems.

With that object in mind, the present invention provides in one aspect apparatus for providing a vector connection between an opening in a generally enclosed walkway and an opening in a structure located adjacent the walkway, the apparatus being mountable at the walkway opening so as to vector seal between the walkway and the apparatus, the apparatus including a tubular sealing part providing a passageway with one open end for surrounding the walkway opening and an opposite open end for surrounding the structure opening, the sealing part being composed of flexible material and having a plurality of expandable chambers extending peripherally about the passageway, expansion of the chambers flexing the sealing part causing it to project at least substantially axially from the walkway and abut with a surface of the adjacent structure so that the other open end of the passageway surrounds the structure opening, contraction of the chambers allowing the sealing part to be retracted from the structure back to adjacent the walkway opening, at least one of the chambers being adjacent the opposite open end of the passageway and deforming as necessary upon abutment of the sealing part with the structure so that the sealing part conforms to the structure surface and vector seals completely about the structure opening.

In another aspect, the present invention provides a passenger transfer structure for providing a passenger access path between an opening of a terminal building and a doorway of a stationery travel craft spaced from the building, the structure including: a connecting bridge extending from the building opening and providing an enclosed walkway for passengers, the connecting bridge having an opening remote from the building opening and located adjacent the stationery travel craft for passenger transfer thereto; and, the above apparatus for providing a vector connection between the walkway opening and the doorway, the apparatus being mounted on the bridge adjacent the walkway opening so as to vector seal between the walkway and the apparatus, and the apparatus being arranged for abutting against the travel craft so as to vector seal completely about the doorway.

The expandable chambers are preferably arranged side-by side along the sealing part with each chamber extending peripherally entirely about the passageway. Those chambers may extend entirely along the sealing part between the open ends of the passageway.

The sealing part preferably has a series of corrugations extending peripherally about the passageway so that upon expansion and contraction the sealing part respectively unfolds and folds in a bellows-like manner. Each expandable chamber is preferably located within a respective corrugation.

Each expandable chamber is preferably expanded by supplying with an inflation gas to cause the sealing part to inflate and thereby project from the walkway, and is contracted by removing the inflation gas to deflate, and thereby retract, the sealing part. The chambers are preferably separate from one another for individual inflation and deflation.

Preferably a plurality of elongate stiffening ribs are connected to the sealing part so as to extend peripherally thereof. These ribs support the sealing part against radial collapse but do no inhibit axial projection or retraction of the sealing part.

Preferably at least one support mechanism is connected to the sealing part for supporting the sealing part against radial collapse and also assisting in projection and retraction of the sealing part.

The transfer structure preferably also includes an assembly for providing a gas barrier curtain across the walkway. That curtain preferably provides a vector barrier between the travel craft and terminal building, yet permits ready passage of persons therebetween, during use of the transfer structure.

The barrier curtain assembly preferably includes at least one gas outlet directing the gas across the walkway to form the curtain. The curtain preferably extends entirely across the walkway. That curtain will preferably be generally planar and extend perpendicular to the axial extent of the walkway.

The following description refers to a preferred embodiment of the apparatus and transfer structure of the present invention. To facilitate an understanding of the invention, reference is made in the description to the accompanying drawings where the apparatus and structure are illustrated. It is to be understood that the invention is not limited to the embodiment as hereinafter described and as illustrated.

In the drawings:

FIG. 4 is a side view of part of the structure of FIG. 2;

FIG. 5 is a side view of part of the structure of FIG. 1 when in use;

FIG. 8 is a detailed side view of the apparatus of the transfer structure of FIG. 1;

FIG. 9 is a detailed front elevational view of part of the apparatus of FIG. 8;

Figure 1:
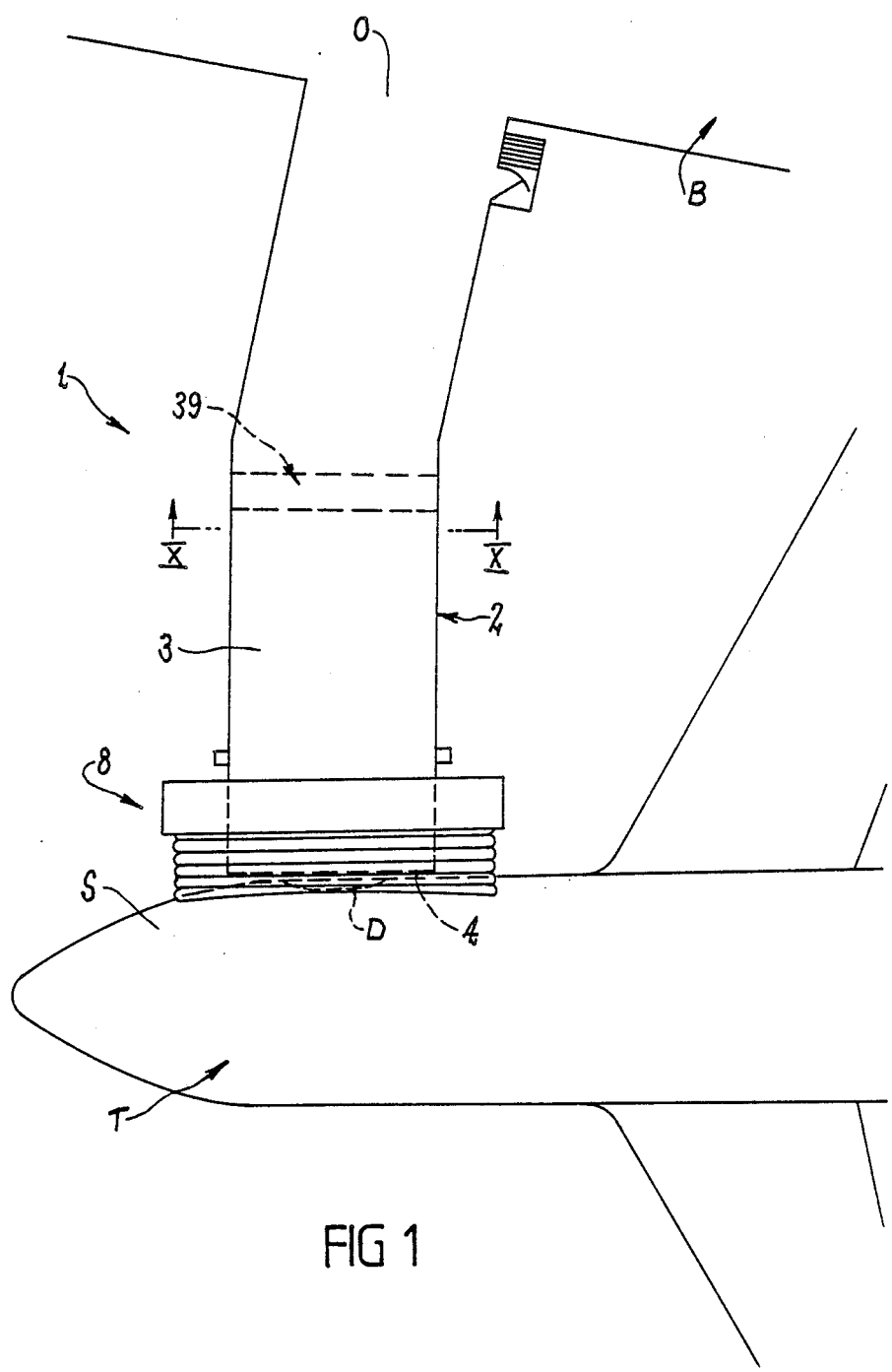
FIG. 1 is a top plan schematic view of a passenger transfer structure according to a preferred embodiment of the present invention in use at an airport.

Referring initially to FIG. 1 there is generally illustrated passenger transfer structure 1, for providing an access path between opening O, of terminal building B, and doorway D, of parked travel craft T. In this embodiment building B, is an airport terminal whilst travel craft T, is an aircraft, although structure 1, may be used with other buildings and travel craft.

Figure 10:
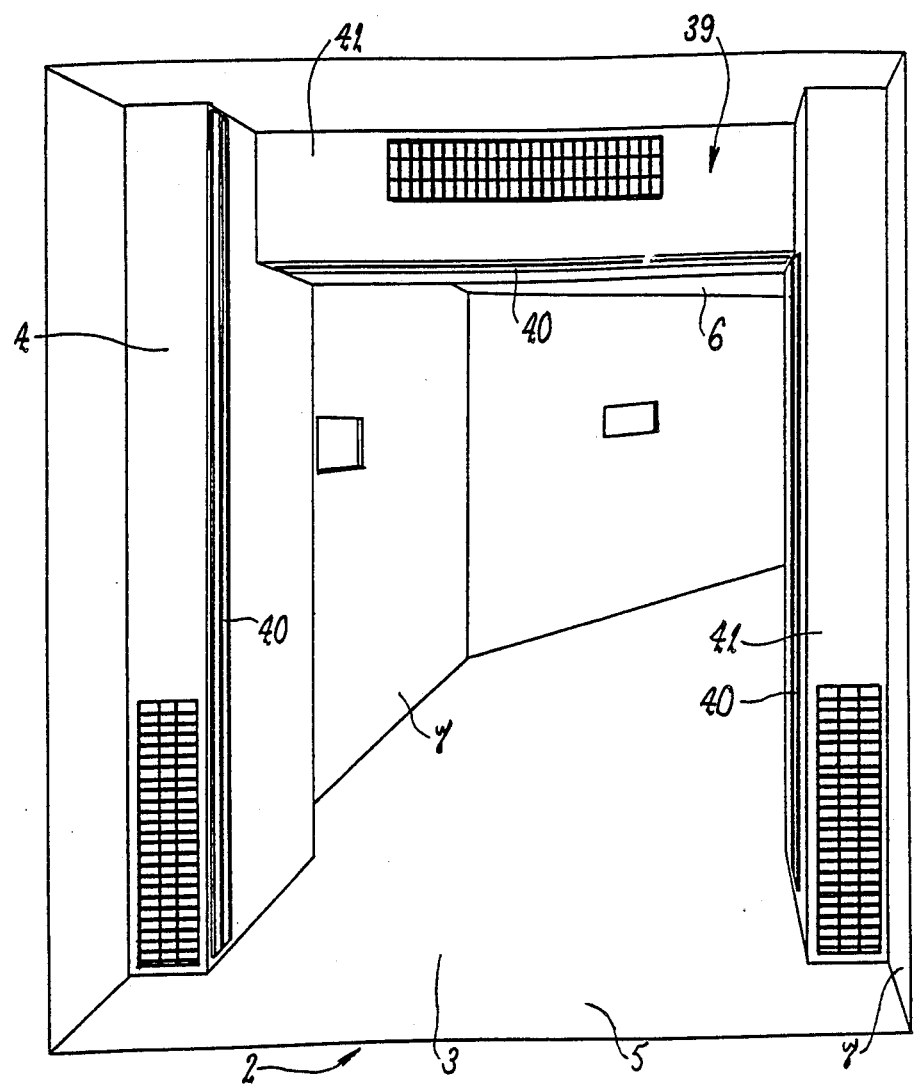
FIG. 10 is a perspective schematic view of the barrier curtain assembly of the transfer structure of FIG. 1.

Structure 1, broadly includes connecting bridge 2, extending from opening O, to adjacent travel craft T. Bridge 2, provides enclosed walkway 3, which ends in opening 4, remote from building B, and adjacent doorway D. Bridge 2, may be of any generally well known construction and in that regard may be fixed and permanently positioned, or be substantially mobile, or be able to fold, or telescope, or pivot, or otherwise move relative to building B. The interior of bridge 2, is illustrated in more detail in FIG. 10 and conveniently has floor 5, ceiling 6, and opposed side walls 7, extending therebetween so as to define walkway 3, therebetween. Bridge 2, may be constructed of any suitable material, such as suitable fire resistant material.

Figure 2:
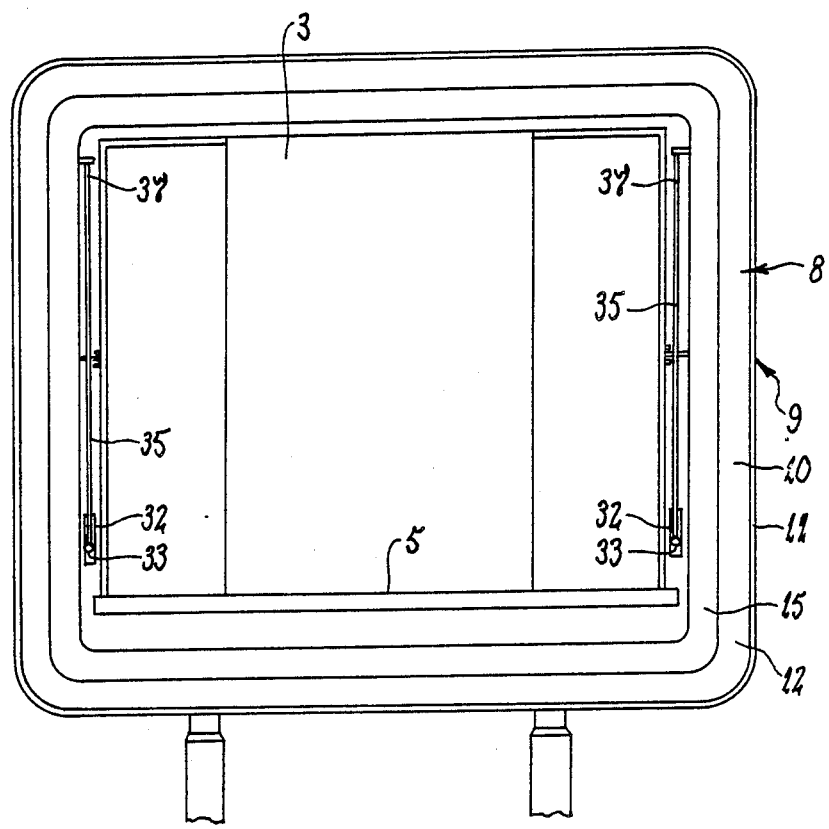
FIG. 2 is a front view of the structure of FIG. 1 when not in use.
Figure 3:
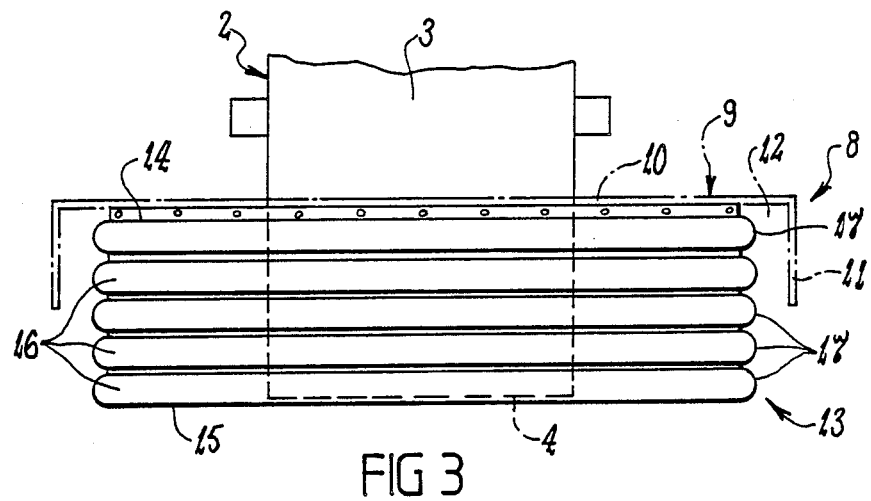
FIG. 3 is a top plan view of part of the structure of FIG. 2.

Mounted on bridge 2, adjacent opening 4, is apparatus 8, which provides a final connecting passageway between opening 4, and doorway D. Apparatus 8, may be generally of a "bolt on" construction for ready mounting on bridge 2. Apparatus 8, surrounds bridge 2, and walkway opening 4, and, as illustrated in FIG. 1, can project forwardly thereof so as to abut travel craft T, entirely about doorway D. Apparatus 8, is mounted on bridge 2, and abuts travel craft T, so as to provide an effective vector seal between the interior of travel craft T, and walkway 3. Apparatus 8, is illustrated in more detail in FIGS. 2 to 6 with FIGS. 2 to 4 showing apparatus 8, when not in use with travel craft T, and FIGS. 5 and 6 when in use.

Apparatus 8, includes mounting part 9, through which apparatus 8, is mounted on bridge 2, to vector seal therebetween. Mounting part 9, includes mounting collar 10, extending about bridge 2, for fixing thereto. Fixing may be achieved through any suitable arrangement, such as by bolting or welding thereto. Collar 10, may be composed of metal or plastic based material. Mounting part 9, also includes protective flange 11, extending axially outwardly from mounting collar 10, so as to form a protective housing having recess 12, surrounding bridge 2, adjacent opening 4. Protective flange 11, may be formed integral with or fabricated to mounting collar 10, and may be composed of the same material as collar 10.

Figure 6:
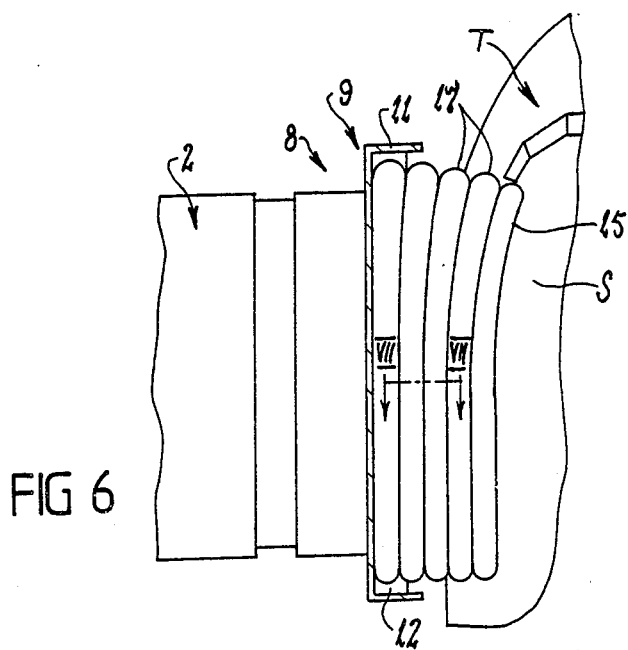
FIG. 6 is a top plan view of the structure part of FIG. 5.

Apparatus 8, also includes sealing part 13. Sealing part 13, is tubular and shaped so as to surround bridge 2, at opening 4, and extend generally coaxial thereof. Sealing part 13, provides a through passageway having opposite ends 14, 15, with part 13, being connected to mounting collar 10, at an end 14 and arranged for abutment with outer surface S, of travel craft T, around doorway D, at end 15. In that regard, as illustrated in FIGS. 2 to 4 when not in use sealing part 13, is retracted generally into recess 12, with end 15, facing outwardly therefrom, but in use axially projects from chamber 12, until end 15, surrounds doorway D, as illustrated in FIGS. 5 and 6.

Sealing part 13, may be of a generally constant axial profile, or may alter profile between ends 14, 15, particularly where the shape or walkway opening 4, and doorway D, differ from one another. As illustrated, sealing part 13, may be of a rectangular tubular axial profile generally consistent with the shape of opening 4, and doorway D.

Sealing part 13, is composed of a flexible material having a fire resistant quality. In the example application, the material will have a minimum fire resistance period of five minutes under severe fire exposure conditions. Such material may be WELDSAFE 720, WELDSAFE 1500, NEO-ALUMINIUM 180, or NEO-GLASS 180.

Figure 7:
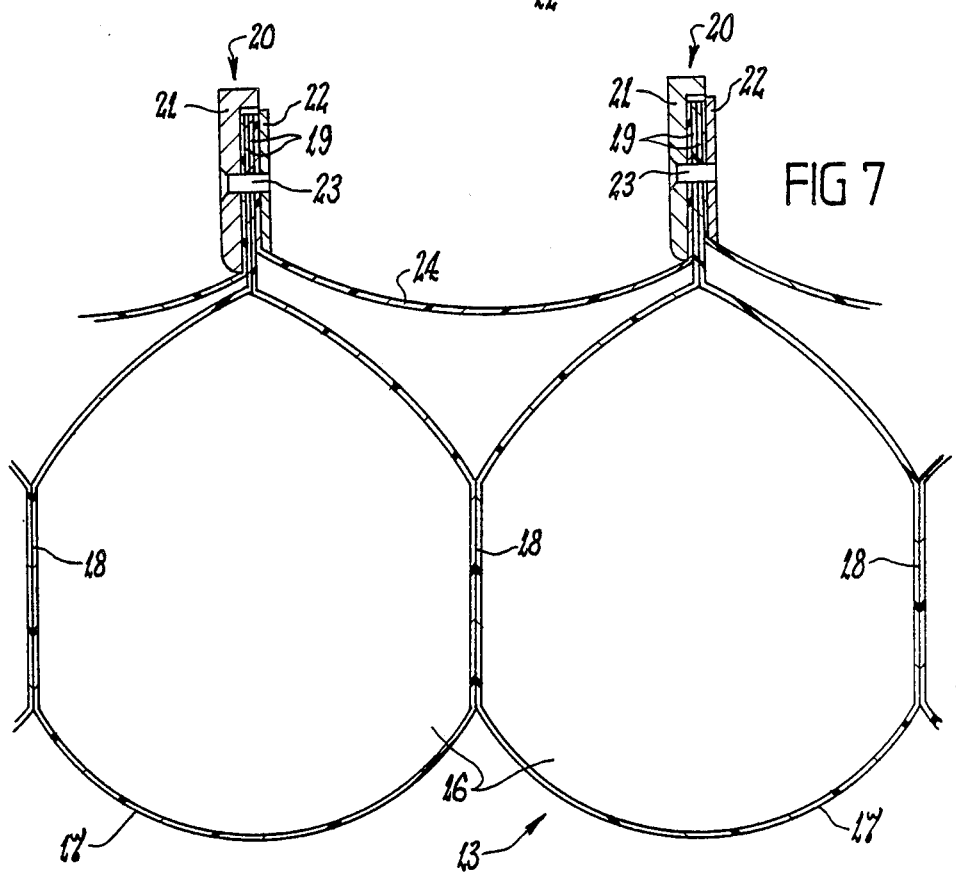
FIG. 7 is a detailed cross sectional view through section VII—VII.

To achieve projection and retraction, sealing part 13, is constructed so as to be expandable and contractable respectively. To that end, sealing part 13, is provided with a plurality of expandable chambers 16, arranged side-by-side between ends 14, 15, and extending peripherally about sealing part 13. Two such chambers 16, are shown in FIG. 7 where a section of sealing part 13, is illustrated in more detail.

Each chamber 16, is expandable by supplying with an inflation gas (not illustrated) to cause inflation of sealing part 13, whilst removal of that gas causes deflation. To provide chambers 16, sealing part 13, is corrogated so as to form a series of corrugations 17. Each chamber 16, is located within respective corrugations 17. This corrugation facilitates projection and contraction of sealing part 13, by providing for orderly folding and unfolding of sealing part 13, in a bellows like manner. That folding and unfolding occurs both between and in corrugations 17.

Chambers 16, are isolated from one another and inflatable and deflatable through at least one port (not illustrated) communicating therewith. Chambers 16, may be inflated and deflated to different extents and in different orders to vary movement of sealing part 13, during projection and contraction. In addition, this plurality of chambers 16, can minimise loss of operation and effectiveness of apparatus 1, should any one chamber 16, be punctured or ruptured.

The ports into chambers 16, are connectable to a source of compressed gas to enable inflation. That source may be provided by a gas pump (not illustrated) delivering gas through a network of delivery lines (not illustrated) for deflation. The gas source may be disconnected and the ports opened for gas release from chambers 16. Alternatively, at least some of the ports may be selectively connectable to a source of vacuum for gas extraction from chambers 16. That source may be provided by a vacuum pump, again withdrawing gas through a network of lines. The inflation gas may typically be air.

Sealing part 13, may be constructed in any suitable manner. As illustrated in FIG. 7, that may be achieved through individual fabrication of corrugation 17, which are then axially interconnected at connection 18, such as by welding together. Individual corrugation 17, may be fabricated by folding strip material into a tubular profile with overlapping side edges 19, being connected together, such as by seam welding.

Sealing part 13, at passageway end 15, may be of a planar configuration extending perpendicular to the axial extent of sealing part 13, (as illustrated). In this arrangement, flexibility of sealing part 13, should ensure that it deforms as necessary at end 15, to adopt a shape that adequately seals against travel craft T, about doorway D. Alternatively, although not illustrated, sealing part 13, may be of a specific configuration at end 15, having regard to the shape of travel craft T, against which it is to abut; that may improve sealing therebetween.

To support sealing part 13, against radial collapse, particularly when projecting to travel craft T, a plurality of stiffening ribs 20, are connected thereto. These ribs extend peripherally of sealing part 13. In that regard, ribs 20, may be located inside (as illustrated) or outside (not illustrated) sealing part 13, and may extend partly (not illustrated) or entirely (as illustrated) along either the inner or outer periphery of sealing part 13. Ribs 20, conveniently extend along respective corrugations 17.

Ribs 20, are rigid in their longitudinal direction and in the lateral direction of sealing part 13. However, those ribs are conveniently flexible in the axial direction of sealing part 13. This flexibility may assist in abutment with travel craft T, to create a vector seal as will become apparent hereinafter.

Each stiffening rib 20, includes separate rib pieces 21, 22, between which can be clamped side edges 19, of respective corrugation 17. This not only secures ribs 20, to sealing part 13, but also provides an auxiliary connection between edges 19. Rib pieces 21, 22, are conveniently secured together by means of fastening elements 23, such as screw studs (as illustrated).

As a secondary vector seal in the event that a corrugation 17, may rupture, barrier rings 24, may extend between and be connected to adjacent stiffening ribs 20. That connection may be achieved by clamping edge regions of rings 24, between ribs pieces 21, 22. Barrier rings 24, may be composed of flexible fabric material which may be the same as that of sealing part 13.

Projection and retraction of sealing part 13, may be achieved solely through inflation and deflation of chambers 16. In an alternative arrangement however, apparatus 1, may further include one or more support mechanisms 25, connected to sealing part 13, for assisting in projection and retraction. Support mechanism 25, may also support sealing part 13, against collapse. As illustrated generally in FIG. 2 a pair of support mechanisms 25, are provided one on each opposite side of sealing part 13. It should be appreciated however, that only one support mechanism 25, may be necessary.

One support mechanism 25, is illustrated in detail in FIGS. 8 and 9, and includes elongate guide rail 26, extending parallel to support part 13. Guide rail 26, is formed of sections 27, 28, which telescope one within the other. In particular, rail section 28, longitudinally telescopes within rail section 27. Rail section 27, is secured at one end thereof to mounting collar 10, whilst rail section 28, is secured to sealing part 13, at a corresponding end thereof intermediate passageway ends 14, and 15. Each rail section 27, 28, is provided with longitudinal slot 29, which slots coalign. Juxtaposed ends of slots 29, can be left open so that slots 29, open into one another whilst remote ends thereof are generally closed or blocked.

Support mechanism 25, also includes a series of support pins 30, one each mounted on respective stiffening ribs 20, and projecting outwardly therefrom so as to engage in one slot 29. Pins 30, are sized to as to slide along slot 29, as sealing part 13, is projected and retracted. By suitable sizing of slots 29, it is possible to limit the extent of projection of sealing part 13, particularly at end 15. This is illustrated in FIG. 8 where it can be seen that support pin 30, adjacent end 15, abuts the closed end of slot 29, in rail section 28, to inhibit further sealing part movement. This limitation is restricted to a region of sealing part 13, adjacent guide rail 26, so that regions remote from rail 26, may further project to produce a concavity deformation in sealing part 13, at end 15. This may be particularly suitable when abutting part 13, against a similarly shaped travel craft T, in order to facilitate sealing therebtween. The axial flexibility of ribs 20 permits this deformation.

Support mechanism 25, also includes linear drive motor 31, mounted on bracket 32, which in turn is mounted on collar 10. Linear drive motor conveniently includes pneumatically powered cylinder 33, and piston 34.

Linear drive output from motor 31, is transmitted to sealing part 13, to facilitate projection and retraction. That connection is achieved with rigid connection arm 35, having one end 36, pivotably connected to piston 34, and opposite end 37, connected to sealing part 13. Connection to sealing part 13, may be achieved through stiffening ribs 20. Intermediate ends 36, 37, connection arm 35, is pivotably connected at pivot 38, therewith. Location of the connection between end 37, and sealing part 13, at an uppermost region of sealing part 13, adjacent end 15, (as illustrated in FIG. 8) assists in achieving the concavity of sealing part 13, at end 15, to further facilitate abutment with travel craft T.

To further assist in vector sealing between the interior of travel craft T, and building B, transfer structure 1, includes assembly 39, for providing a gas barrier curtain across walkway 3. Gas barrier curtain assembly 39, is illustrated generally in FIG. 1 and in more detail in FIG. 10 and includes at least one gas blower (not illustrated) and a plurality of gas outlets 40, for delivering gas across walkway 3, from different directions to form the barrier curtain. Outlets 40, are axially offset one from another relative to walkway 3, so that the curtain has a perceptable depth and gas dwell pockets are minimised. As illustrated, at least three outlets 40, are provided one located against ceiling 6, and one each against respective side walls 7. Outlet 40, against ceiling 6, is offset from those against each side wall 7, and outlets 40, on respective side walls are offset from one another.

Each gas outlet 40, may be provided by an outlet nozzle (not illustrated) so that several nozzles are positioned adjacent ceiling 6, and side walls 7. Alternatively, (as illustrated) gas outlets 40, may be provided by diffuser slots, each extending across ceiling 6, or down a respective side wall 7. Each diffuser slot may be louvered to enable control of gas flow direction.

Each gas outlet 40, may be connected directly to the or a respective gas blower. Alternatively, outlets 40 may be mounted one plenum boxes 41, located adjacent ceiling 6, and side walls 7.

The or each gas blower may include a blower fan. The or each fan may be mounted on or in walkway 3, or remote therefrom. That gas may be air drawn from within walkway 3, or the surrounding atmosphere. That air may be filtered in a usual air conditioning manner by gas barrier curtain assembly 39.

The or each blower fan may be of any suitable construction for delivering an adequate supply of air to gas outlets 40. In the example application of structure 1, the fans will be sufficient to establish a gas speed from gas outlets 40, of between about 8 and 30 metres per second.

Transfer structure 1, as detail above may be used at airports in a similar manner to existing passenger transfer bridges. However, with sealing part 13, retracted and travel craft T, maneouvered into a usual parking station adjacent opening 4, sealing part 13, is inflated. Progressive inflation of sealing part 13, together with actuation of each support mechanism 25, moves sealing part 13, away from mounting collar 10, out of recess 12, toward doorway D. That movement continues until end 15, engages an outer surface S, of travel craft T, surrounding doorway D, and presses firmly against that surface S, in a vector sealing manner. Depending on the configuration of sealing part 13, at end 15, and outer surface S, of travel craft T, sealing part 13, may flex or deform to accommodate shape discrepancies or misalignment.

The gas barrier curtain can then be established by suitable operation of the blower fans of assembly 39. A vector proof region is thus established within walkway 3, between the barrier curtain and doorway D.

It will be appreciated that separation of travel craft T, from structure 1, can be achieved by reversing the above outlined procedure.

Figure 11:
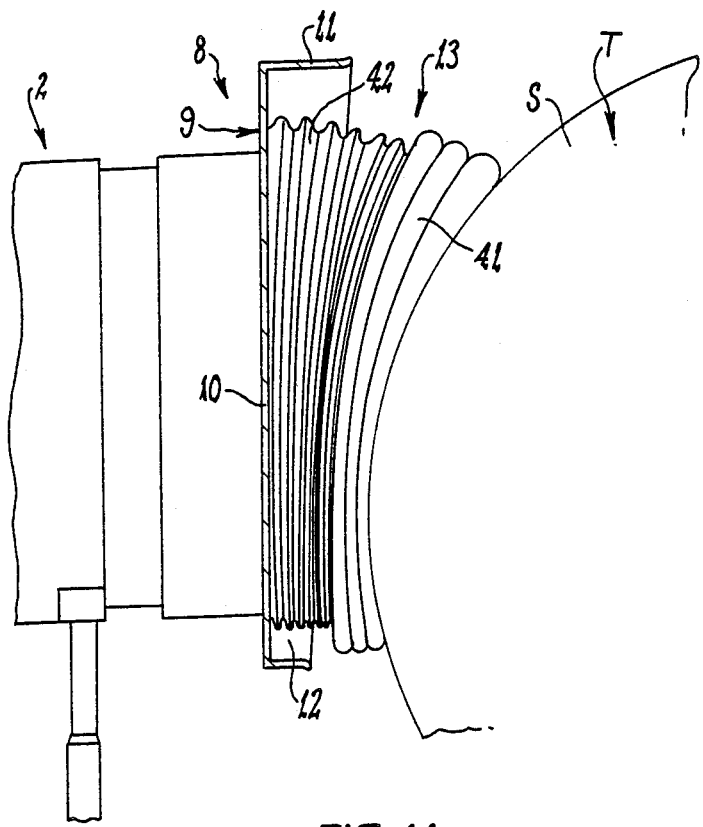
FIG. 11 is a side view of part of a transfer structure according to another embodiment of the present invention when in use.

Numerous modifications may be made to structure 1, and in particular apparatus 8, as detailed in the above embodiment. One such modification is illustrated in FIG. 11. In this embodiment sealing part 13, is modified to an extent that expandable chambers 16, are provided only in portion 41, adjacent end 15, and not entirely along sealing part 13, to end 14. Thus, remaining portion 42, of sealing part 13, may be in the nature of a non-inflatable corrugated tube.

The above embodiments illustrate apparatus 8, mounted so that collar 14, extends perpendicular to the longitudinal extent of bridge 2. As an alternative, mounting collar 14, may be otherwise angled relative thereto, such as by angling downwardly, and that may be particularly suitable for use with some travel craft T.

In the above embodiments chambers 16, are expanded and collapsed through inflation and deflation with gas. It is envisaged that expansion and contraction may be achieved with other mediums provided within chambers 16. Such mediums may be permanently located within chambers 16, and may be resiliently compressible so as to compress upon retraction of sealing part 13, and expand upon projection of sealing part 13. Such mediums may include sponge rubber or foamed plastic material.

The transfer structure according to the present invention may provide for safe and efficient transfer of persons between a walkway and adjacent structure. That may be achieved while ensuring effective quarantine between the walkway and structure.

A further advantage of the transfer structure is that it may replace existing similar structures without necessitating major overhauls or renovations of surrounding or associated structures. Thus, in the example application, the structure may be incorporated into airport terminals without having to substantially modify the terminal buildings and without having to modify the aircraft. Moreover, the connection apparatus may be even used with existing transfer bridges.

Finally, it is to be appreciated that various modifications and/or alterations may be made to the connecting apparatus and transfer structure without departing from the ambit of the present invention as defined in the claims appended thereto.

Having now described my invention what I claim as new and desire to secure by Letters Patent is:

1. Apparatus for providing a vector connection between an opening in a generally enclosed walkway and an opening in a structure located adjacent the walkway, the apparatus being mountable at the walkway opening so as to vector seal between the walkway and the apparatus, the apparatus including a tubular sealing part providing a passageway with one open end for surrounding the walkway opening and an opposite open end for surrounding the structure opening, the sealing part being composed of flexible material and having a plurality of expandable chambers arranged in side-by-side relationship, each chamber being of a generally endless encompassing configuration and extending peripherally entirely about the passageway, expansion of the chambers flexing the sealing part causing it to project at least substantially axially from the walkway and abut with a surface of the adjacent structure so that the other open end of the passageway surrounds the structure opening, contraction of the chambers allowing the sealing part to be retracted from the structure back to adjacent the walkway opening, at least one of the chambers being adjacent the opposite open end of the pasageway and deforming as necessary upon abutment of the sealing part with the structure so that the sealing part conforms to the structure surface and vector seals completely about the structure opening, a plurality of elongated stiffening ribs connected to the sealing part so as to extend peripherally thereof, and the stiffening ribs being independent of each other and supporting the sealing part against radial collapse but not inhibiting axial projection or retraction of the sealing part.

2. Apparatus as claimed in claim 1, wherein the expandable chambers are arranged side-by-side entirely along the sealing part between the open ends of the passageway.

3. Apparatus as claimed in claim 1 wherein the sealing part has a series of corrugations extending peripherally about the passageway, each expandable chamber being located within a respective corrugation, and upon expansion and contraction the sealing part respectively unfolds and folds in a bellows-like manner.

4. Apparatus as claimed in claim 1, wherein each expandable chamber is expanded by supplying with an inflation gas to cause the sealing part to inflate and thereby project from the walkway, and is contracted by removing the inflation gas to deflate, and thereby retract, the sealing part.

5. Apparatus as claimed in claim 4, wherein the expandable chambers are separate from one another with each expandable chamber having at least one port through which the inflation gas can flow for inflation and deflation.

6. Apparatus as claimed in claim 1, wherein the stiffening ribs are flexible in the axial direction of the sealing part in order to flex independently of one another as the sealing part abuts against the structure and conforms to the structure surface.

7. Apparatus as claimed in claim 3, wherein each stiffening rib extends entirely along a respective corrugation of the sealing part, the sealing part unfolding and folding along the stiffening ribs during expansion and contraction, respectively.

8. Apparatus as claimed in claim 1, and further including at least one support mechanism connected to the sealing part for supporting the sealing part against radial collapse and also assisting in projection and retraction of the sealing part.

9. Apparatus as claimed in claim 8, wherein the or each support mechanism includes an elongate guide member mounted so as to extend in the axial direction of the sealing part, and a series of support elements mounted axially along the sealing part and engaging the guide member for supporting the sealing part thereon and moving therealong as the sealing part projects and retracts.

10. Apparatus as claimed in claim 9, wherein the elongate guide member includes a guide rail having elongate sections each mounted on the sealing part and telescopically interconnected one to another, the rail sections telescoping relative to one another during projection and retraction of the sealing part, and the series of support elements includes support pins projecting from the sealing part and slidably engaging with the guide rail to slide along the rail during projection and retraction of the sealing part.

11. Apparatus as claimed in claim 10, wherein the support elements engage with the guide member to limit axial projection of the sealing part at least in the region adjacent the guide member.

12. Apparatus as claimed in claim 11, wherein the or each support mechanism includes a drive unit operable to produce a drive output, and a connection member connecting the drive unit to the sealing part for transmitting the power output to the sealing part causing projection and retraction thereof.

13. Apparatus as claimed in claim 12, wherein the drive unit includes a linear output drive motor, and the connection member includes a rigid connection arm having one end connected to the sealing part and the other end connected to the drive motor, the connection arm being pivotably mounted intermediate the ends thereof so as to pivot under action of the drive motor power output, pivoting of the connection arm causing the sealing part to arcuately project and retract in a region adjacent the one open end of the sealing part passageway.

14. A structure as claimed in claim 1, wherein the sealing part has a series of corrugations extending peripherally entirely about the passageway, each expandable chamber being located within a respective corrugation, and upon expansion and contraction the sealing part respectively unfolds and folds in a bellows-like manner.

15. A structure as claimed in claim 1, wherein the expandable chambers are separate from one another and are expanded by supplying with an inflation gas to cause the sealing part to inflate and thereby project from the walkway, and are contracted by removing the inflation gas to deflate, and thereby retract, the sealing part, each chamber having at least one port through which the inflation gas can flow for inflation and deflation.

16. A structure as claimed in claim 1, wherein the elongated stiffening ribs each extend entirely along a respective corrugation of the sealing part, and are flexible in the axial direction of the sealing part in order to flex independently of one another as the sealing part abuts against the travel craft and conforms to the travel craft surface.

17. A structure as claimed in claim 1, wherein the apparatus further includes at least one support mechanism connected to the sealing part for supporting the sealing part against radial collapse and also assisting in projection and retraction of the sealing part, the or each support mechanism including: an elongate guide member mounted so as to extend in the axial direction of the sealing part; a series of support elements mounted axially along the sealing part and engaging the guide member for supporting the sealing part thereon and moving therealong as the sealing part projects and retracts; a drive unit operable to produce a drive output; and, a connection member connecting the drive unit to the sealing part for transmitting the power output to the sealing part causing projection and retraction thereof.

18. A passenger transfer structure for providing a passenger access path between an opening of a terminal building and a doorway of a stationery travel craft spaced from the building, the structure including: a connecting bridge extending from the building opening and providing an enclosed walkway for passengers, the connecting bridge having an opening remote from the building opening and located adjacent the stationery travel craft for passenger transfer thereto; and, apparatus for providing a vector connection between the walkway opening and the doorway, the apparatus being mounted on the bridge adjacent the walkway opening so as to vector seal between the walkway and the apparatus, the apparatus including a tubular sealing part providing a passageway with one open end for surrounding the walkway opening and an opposite open end for surrounding the doorway, the sealing part being composed of flexible material and having a plurality of expandable chambers arranged in side-by-side relationship, each chamber being of a generally endless encompassing configuration and extending peripherally entirely about the passageway, expansion of the chambers flexing the sealing part causing it to project at least substantially axially from the walkway and abut with a surface of an adjacent travel craft so that the other open end of the passageway surrounds the doorway, contraction of the chambers allowing the sealing part to be retracted from the travel craft back to adjacent the walkway opening, at least one of the chambers being adjacent the opposite open end of the passageway and deforming as necessary upon abutment of the sealing part with the travel craft so that the sealing part conforms to the travel craft surface and vector seals completely about the doorway, a plurality of elongated stiffening ribs connected to the sealing part so as to extend peripherally thereof, and the stiffening ribs being independent of each other and supporting the sealing part against radial collapse but not inhibiting axial projection or retraction of the sealing part.

19. A structure as claimed in claim 18, and further including an assembly operable to provide a gas barrier curtain entirely across the walkway so as to form a vector barrier between the terminal building opening and the walkway opening.

20. A structure as claimed in claim 19, wherein the barrier curtain assembly includes at least one gas blower for providing pressurised gas, and at least one gas outlet directing the gas across the walkway to form the curtain.

21. A structure as claimed in claim 20, wherein a plurality of gas outlets are provided, the outlets being spaced about the walkway and relatively offset one from another axially of the walkway.

22. A structure as claimed in claim 19, wherein the expandable chambers are arranged side-by-side along the sealing part with each chamber extending peripherally entirely about the passageway.

* * * * *